United States Patent [19]
Kimura et al.

[11] Patent Number: 5,710,646
[45] Date of Patent: Jan. 20, 1998

[54] HEAD-UP DISPLAY

[75] Inventors: Teiyuu Kimura; Hiroshi Ando, both of Nagoya; Minako Sugiura, Anjyo; Kazumasa Kurokawa; Suzuo Ban, both of Kariya, all of Japan

[73] Assignee: Nippondenso Co., Ltd., Kariya, Japan

[21] Appl. No.: 438,734

[22] Filed: May 10, 1995

[30] Foreign Application Priority Data

Jun. 7, 1994 [JP] Japan ................................ 6-150372
Feb. 10, 1995 [JP] Japan ................................ 7-046350

[51] Int. Cl.$^6$ ................................ G03H 1/00; G02B 5/32; G02B 27/14
[52] U.S. Cl. ................................ 359/14; 359/13; 359/15; 359/630; 359/631
[58] Field of Search ................................ 359/13, 14, 15, 359/19, 630, 631

[56] References Cited

U.S. PATENT DOCUMENTS

| | | | |
|---|---|---|---|
| 4,600,271 | 7/1986 | Boyer et al. ...................... | 359/13 |
| 4,688,880 | 8/1987 | Tatsuno et al. .................... | 359/19 |
| 4,786,125 | 11/1988 | Margarinos et al. ............... | 359/7 |
| 4,842,389 | 6/1989 | Wood et al. ...................... | 359/14 |
| 5,461,499 | 10/1995 | Sugita et al. .................... | 359/13 |

FOREIGN PATENT DOCUMENTS

| | | |
|---|---|---|
| 4113381 | 4/1992 | Japan. |
| 5158394 | 6/1993 | Japan. |

Primary Examiner—Paul M. Dzierzynski
Assistant Examiner—Audrey Chang
Attorney, Agent, or Firm—Cushman, Darby & Cushman IP Group of Pillsbury, Madison & Sutro LLP

[57] ABSTRACT

A head-up display includes a projector which projects an image light and a hologram lens which diffracts and reflects the projected image and form a virtual image located ahead of a windshield. The hologram lens has a vertical diffraction characteristic which is equivalent to a hyperbolic or parabolic-curve mirror along a line formed by the intersection of the hologram lens and a vertical plane which includes an axis of the image light and a horizontal diffraction characteristic which is equivalent to a parabolic or elliptic curve mirror along a line which is formed by the intersection of the hologram lens and a horizontal plane which includes the axis of the image light. When the hologram is directly attached on a curved windshield which has a focal length fs (in case it is a mirror), the focal length fo of the hologram and the former focal length fs has the following relationship; $1/fo = 1/fh + 1/fs$, where fh is a focal point when the hologram is flat.

8 Claims, 12 Drawing Sheets

HEAD-UP DISPLAY

CROSS REFERENCE TO RELATED APPLICATION

The present application is based on and claims priority from Japanese Patent Applications No. Hei 6-150372 filed on Jun. 7, 1994 and No. Hei 7-46350 filed on Feb. 10, 1995, the contents of which are incorporated herein by reference.

BACKGROUND OF THE INVENTION

1. Field of the Invention

The present invention relates to a head-up display using a hologram, and more particularly to a head-up display displaying images with little distortion and aberration.

2. Description of the Related Art

Head-up displays have been widely noticed recently as devices for displaying vehicle speed, warnings, or the like in front of an windshield of a vehicle. Particularly, a display device utilizing a hologram which has wave-length selectivity in diffraction or reflection has been proposed.

As shown in FIG. 15, an image light 30 of a reflection type hologram display 9 is projected from a image projector 90 toward a hologram disposed on a windshield 91 through a reflector member 931 or directly.

A driver 92 looks at a virtual image 31 which is formed by diffraction and reflection of the projected image light 30 on the hologram.

Since the windshield is curved, the hologram is formed to compensate for the curvature when it is formed in such a manner that a certain curvature-compensating optical member is placed in front of a dry plate of the hologram during the exposure of the hologram.

However, such conventional hologram has the following drawbacks. That is, since an angle of incidence (cf. θ1 in FIG. 7) of the image light 30 on a hologram lens and an angle of reflection (cf. θ2 in FIG. 7 ) from the hologram lens is different, optical aberration occurs on the hologram, resulting in that the virtual image is distorted or become aberrant.

In addition, when a driver moves vertically or horizontally, the virtual image is also distorted or become aberrant.

For example, when the driver moves his eye position vertically, a virtual image 811 shifts vertically as illustrated in FIG. 16. On the other hand, when his eyes move horizontally, the virtual image looks floating (as high as h) as illustrated in FIG. 17 and also leans by an angle α as illustrated in FIG. 18. This phenomenon is caused by change in the reflection characteristics due to position change of the incident image light 30, in other words, it is caused by the light angle selectivity of the hologram.

When the driver moves to the left (or the right), the incident light position of the image light 30 on the hologram 94 shifts upward and the virtual image 81 rises as shown in FIG. 17.

SUMMARY OF THE INVENTION

The present invention is made in view of the foregoing problems, and has a primary object of providing an improved head-up display which can provide clear virtual images without significant distortion or aberration of the images.

Another object of the present invention is to provide a head-up display which includes an improved hologram lens. The hologram lens has a diffraction characteristic which is equal to a concave-curve mirror. The concave-curve-diffraction characteristic is formed so that a concave mirror diffraction is formed on a hologram lens along a line formed by intersection of the hologram surface and a vertical plane including the light axis of an image light, and another concave curve mirror diffraction is formed on the hologram lens along a line formed by intersection of the hologram surface and a horizontal plane including the light axis of the image light. The focal lengths of the mirror diffractions are arranged so that virtual images in the vertical direction and in the horizontal direction are focussed on the same position.

Another object of the present invention is to provide a head-up display which includes an improved hologram lens. The hologram lens has a diffraction characteristic which is equal to a concave-curve mirror. The concave-curve-diffraction characteristic is formed so that a hyperbolic-curve mirror diffraction is formed on a hologram lens along a line formed by intersection of the hologram surface and a vertical plane including the light axis of an image light, and parabolic-curve mirror diffraction is formed on the hologram lens along a line formed by intersection of the hologram surface and a horizontal plane including the light axis of the image light. The focal lengths mirror diffractions are arranged so that virtual images in the vertical direction and in the horizontal direction are focussed on the same position.

The parabolic curve mirror (diffraction) is effective to decrease inclination of the virtual image caused when a driver moves his eye position horizontally, and the hyperbolic curve mirror (diffraction) decreases vertical shifting of the virtual image when the driver moves his eye position vertically.

Another object of the present invention is to provide a head-up display which includes another improved hologram lens. The hologram lens has a diffraction characteristic which is equal to a parabolic-curve mirror. The mirror diffractions formed in the vertical direction and in the horizontal direction have different focal lengths f1 and f2 in order to provide the same focussing position of an virtual image in the vertical and horizontal direction.

The parabolic curves with different focal lengths formed in both directions decrease the inclination of the virtual image more effectively and is useful when a clear image without inclination is more desirable than an image without vertical shifting.

A further object of the present invention is to provide a head-up display which includes another improved hologram lens. The hologram lens has a hyperbolic-curve-diffraction characteristic along a line formed by the intersection of the hologram surface and a vertical plane including the axis of the image light, and an elliptic-curve-diffraction characteristic along a line formed by the intersection of the hologram surface and a horizontal plane including the axis of the image light. The focal length of the hyperbolic curve and that of the elliptic curve are preferably arranged so that the focussing position of the virtual images in the vertical direction and in the horizontal direction are the same.

The elliptic curve diffraction in the horizontal direction also decreases the image inclination caused by horizontal movement of the drivers eyes.

A still further object of the present invention is to provide a head-up display which include an improved hologram lens to be pasted on a curved surface of the windshield. The lens has a diffraction characteristic of a concave surface which has a focal length fo when it is pasted on the windshield and has the following relationship with the focal length of the windshield:

$$1/fo = 1/fh + 1/fs,$$

wherein fh is a focal length when the hologram lens is formed on a flat plane and fs is a focal length of a mirror which corresponds to the curved surface of the windshield.

When a hologram lens having the focal length fh is formed and pasted on the curved windshield, the desired focal length fo of the hologram is obtained with ease.

A still further object of the present invention is to provide a head-up display which includes an improved hologram lens to be pasted on a two-dimensional curved-surface of the windshield which corresponds to a mirror having focal lengths fsv in the vertical direction and fsh in the horizontal direction.

The focal length fo of the hologram lens of this case has the following relationship with the focal lengths fhv in the vertical direction and fhh in the horizontal direction of the hologram lens when it is flat and a focal length fsv in the vertical direction and a focal length fsh in the horizontal direction of the mirror corresponding to the curved surface of the windshield where the hologram is attached.

$$1/fo = 1/fhv + 1/fsv = 1/fhh + 1/fsh$$

A further object of the present invention is to provide a head-up display which includes an improved hologram lens. The hologram lens is formed into a convex shape which has a center of curvature positioned at a side of a projector. The curvature is effective to cancel aberrations occurring when a driver moves his eye position to the right or left and prevents the virtual image from floating upward.

A still further object of the present invention is to provide a head-up display which has an improved hologram lens on which the interference pattern is formed so that the inclined angle to the ground increases as the pattern is located more to the right or left from the center of the hologram lens. Accordingly, the floating due to the vertical movement of the eyes mentioned above is also prevented.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENT

Preferred embodiments according to the present invention will now be described with reference to the appended drawings.

Figure 1:
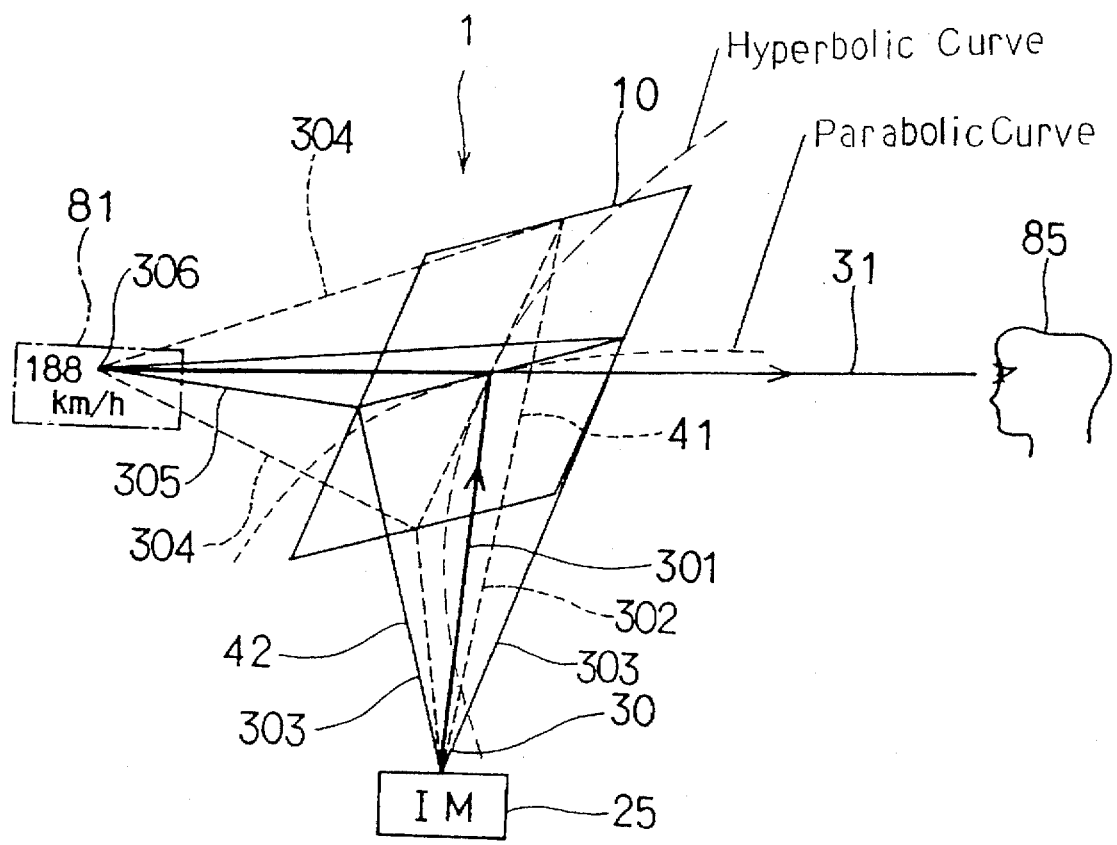
FIG. 1 is a schematic view illustrating a head-up display system according to a first embodiment of the present invention.

In FIG. 1, a head-up display 1 according to a first embodiment of the present invention includes a hologram lens 10 which has a diffraction characteristic of a concave mirror and is disposed on a windshield of a vehicle, a projector 25 which projects an image light 30 toward the hologram lens 10 to form a virtual image 81 in front of the windshield. The diffraction characteristic is formed on the surface of the hologram lens 10 in a manner that a hyperbolic curve characteristic is formed along a line which is formed by the intersection of the hologram surface and a vertical plane 41 including a light axis 301 of the image light 30, and a horizontal curve characteristic is formed along a line which is formed by the intersection of the hologram surface and a horizontal plane including the light axis 301. In other words, a hyperbolic curve is recorded on the hologram lens 10 in the vertical direction and a parabolic curve is recorded on the hologram lens 10 in the horizontal direction.

The focal lengths of the hyperbolic curve and the parabolic curve are set so that the virtual image focused by an image light 302 projected along the vertical plane 41 and the virtual image focused by an image light 303 projected along the horizontal plane 42 are located at the same position.

In other words, a virtual light 304 which corresponds to the image light 302 and a virtual light 305 which corresponds to the image light 303 focus on the same point 306 as shown in FIG. 1.

Figure 2:
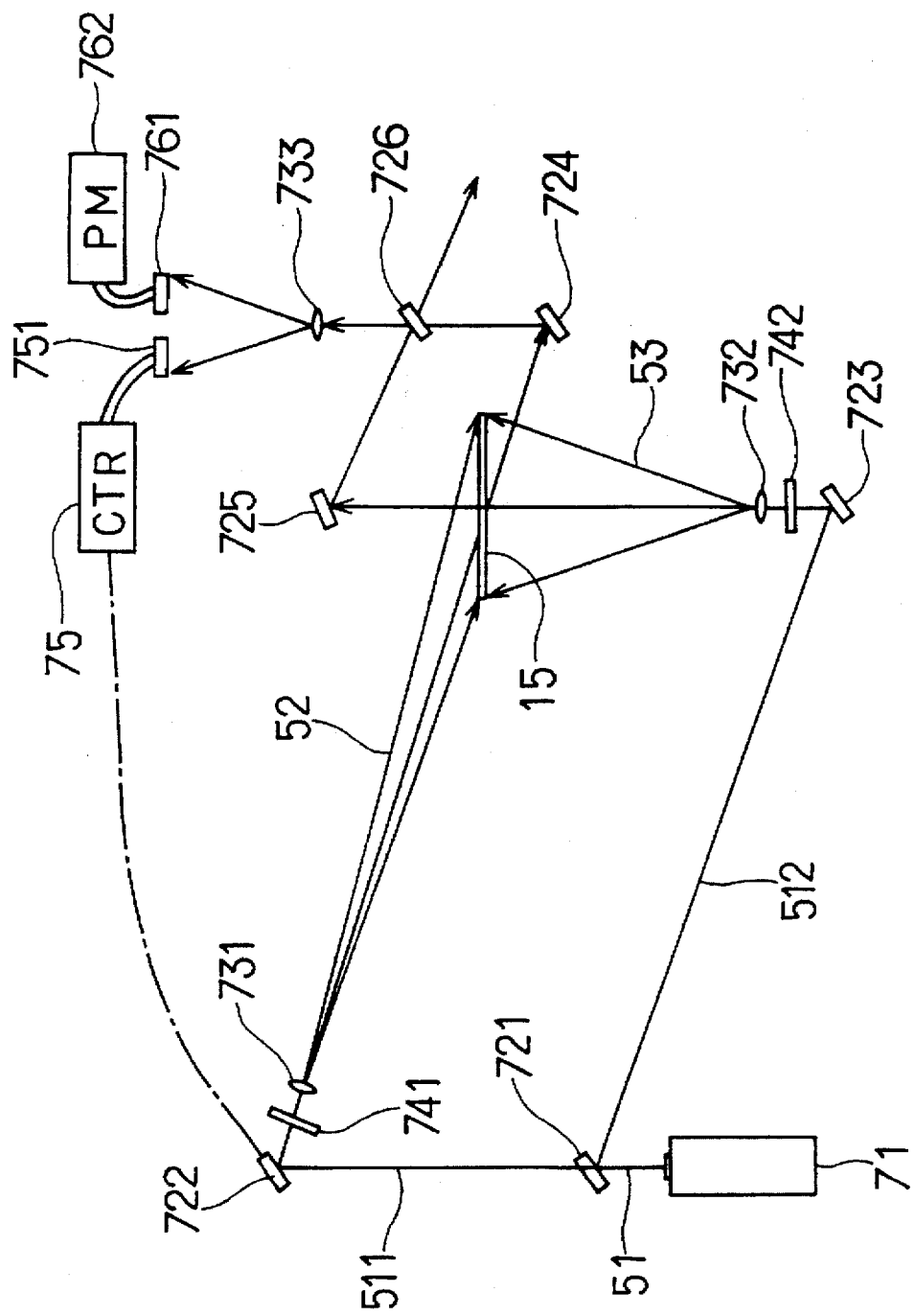
FIG. 2 is a schematic illustration of a manufacturing process of a hologram lens according to the first embodiment.

FIG. 2 illustrates a method of manufacturing the hologram lens according to the first embodiment.

Two luminous fluxes are used in this embodiment. A luminous flux 51 is projected from a laser source 71 and is divided into two fluxes by a half mirror 721. One flux 511 passes through a moving mirror 722 and an object lens 731 and enters a dry plate 15 as a reference light 52 (parallel or diverging light). The surface of the dry plate 15 is applied with a photosensitizer.

The other flux 512 passes a mirror 723 and an object lens 732 and diverges as a object light 53, and enters the dry plate 15.

The object lenses 731 and 732 have shutters 741 and 742 at the light incident side respectively to control switching of the incident light fluxes.

The reference light 52 and the object light 53 pass through the dry plate 15 and are sensed by a photo-sensor 751. A controller 75 is connected to the sensor 751 and controls the moving mirror 722 in response to an output signal of the photo-sensor 751.

In other words, the reference light 52 and the object light 53 are reflected by the mirrors 724 and 725 respectively, received by a half mirror 726, and thereafter go through a lens 733 to the sensor 751 and a sensor 761. The controller 75 checks a condition of the interference pattern formed by the reference light 52 and the object light 53 on the hologram lens according to the output signal of the photo-sensors 751 and 761, and controls the moving mirror 722 to provide a desirable interference pattern.

A numeral reference 762 is an interference power meter for checking changes in the interference pattern in cooperation with sensors 751 and 752.

Since the interference condition is feedback-controlled by a system composed sensors 751 and 752, the controller 75 and the moving mirror 722, a good hologram lens having a stable interference pattern is provided.

Further effects of the above-described method is discussed below in comparison with a conventional method shown in FIG. 14 the same reference numerals are put on corresponding portions in the first embodiment.

Figure 14:
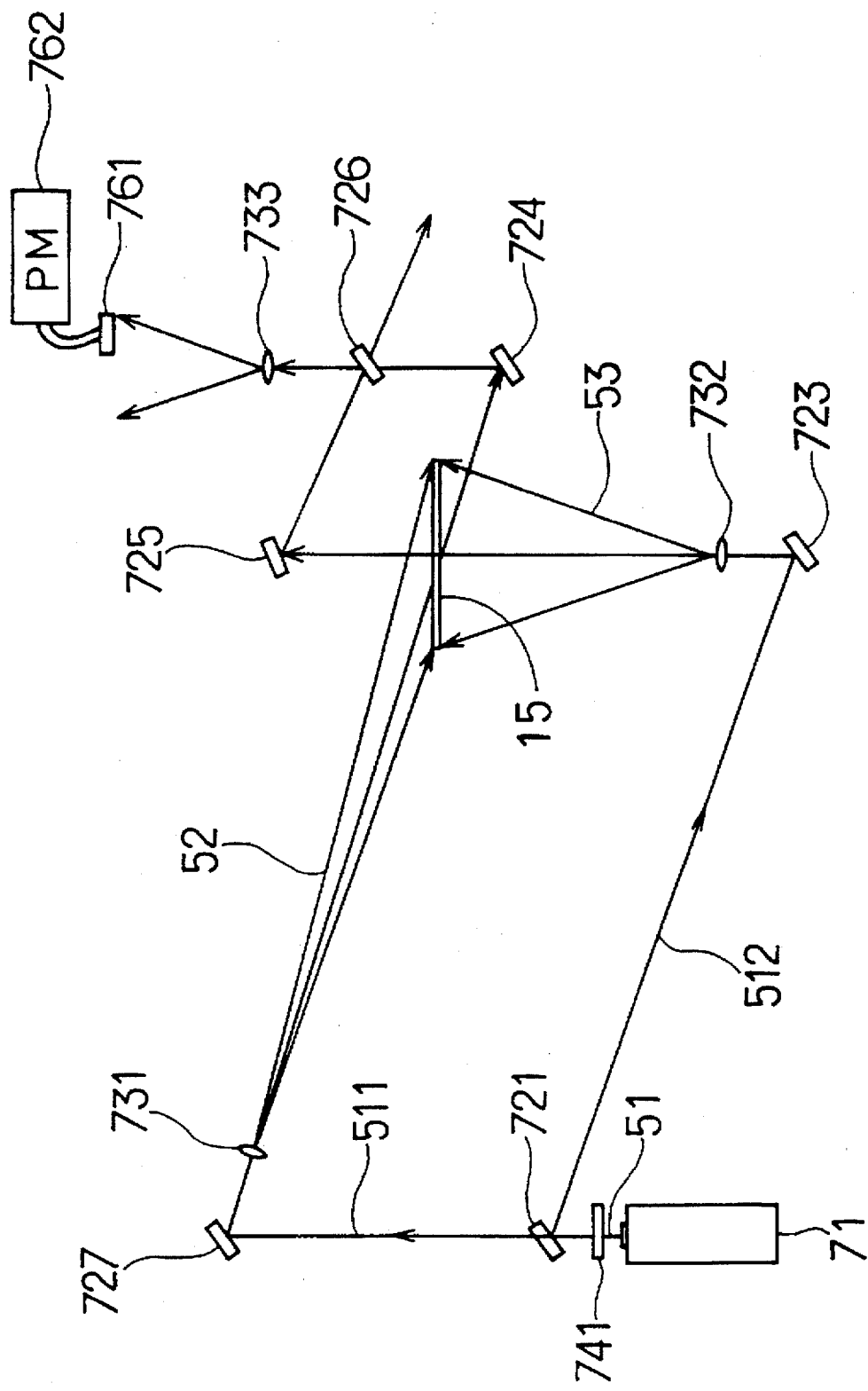
FIG. 14 is a schematic illustration of a manufacturing process of a conventional hologram lens.
Figure 15:
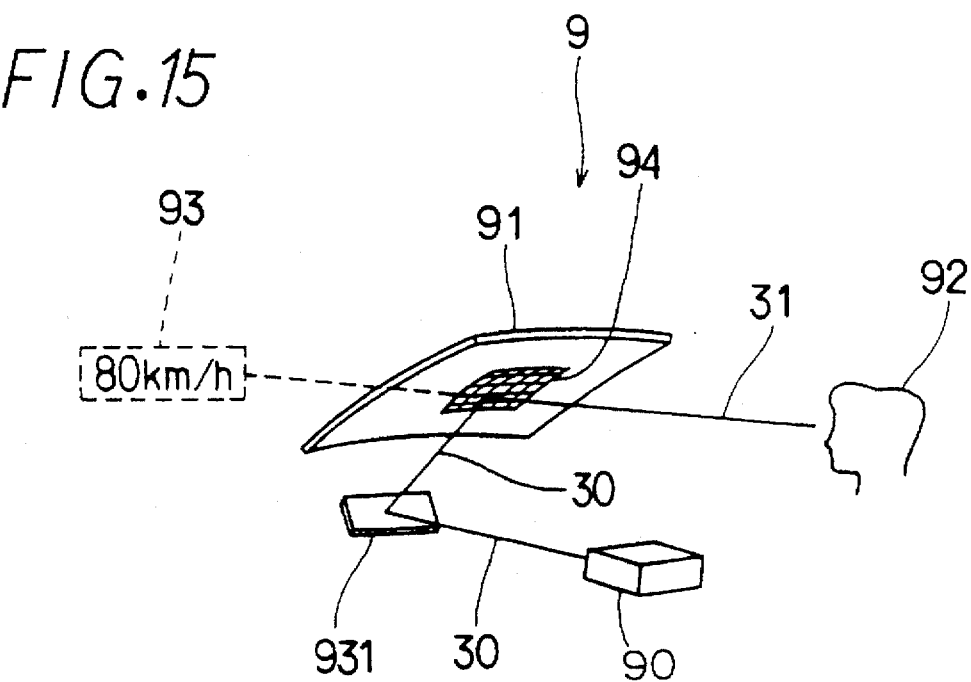
FIG. 15 is a schematic view illustrating a conventional head-up display system.
Figure 16:
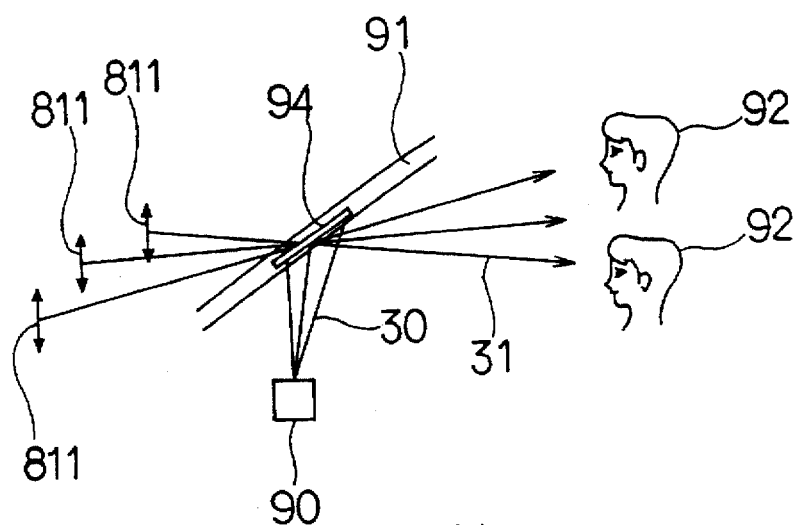
FIG. 16 is a schematic view illustrating position changes of a virtual image of a conventional head-up display when driver's eyes move vertically.
Figure 17:
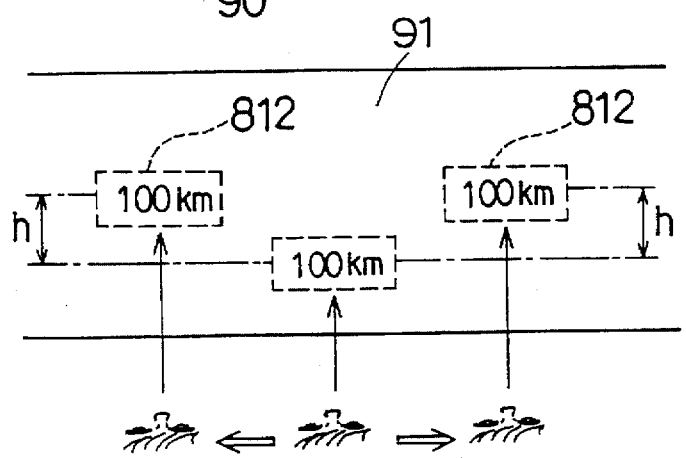
FIG. 17 is a schematic view illustrating position changes of a virtual image of a conventional head-up display when driver's eyes move horizontally.

In FIG. 14, only one shutter 741 is used and disposed in front of the laser source 71. The exposure is only controlled by the single shutter 741. In this case, a stable condition for the exposure to form a clear interference pattern is not maintained for a period longer than 0.5 minute. Because, when the whole laser beams are switched on and off by a single shutter disposed close to the laser source 71, relating optical components and parts of the shutter 741 are thermally affected and deformed, thereby changing relative position of the reference light 52 and the object light 53 incident to the dry panel 15.

Figure 3:
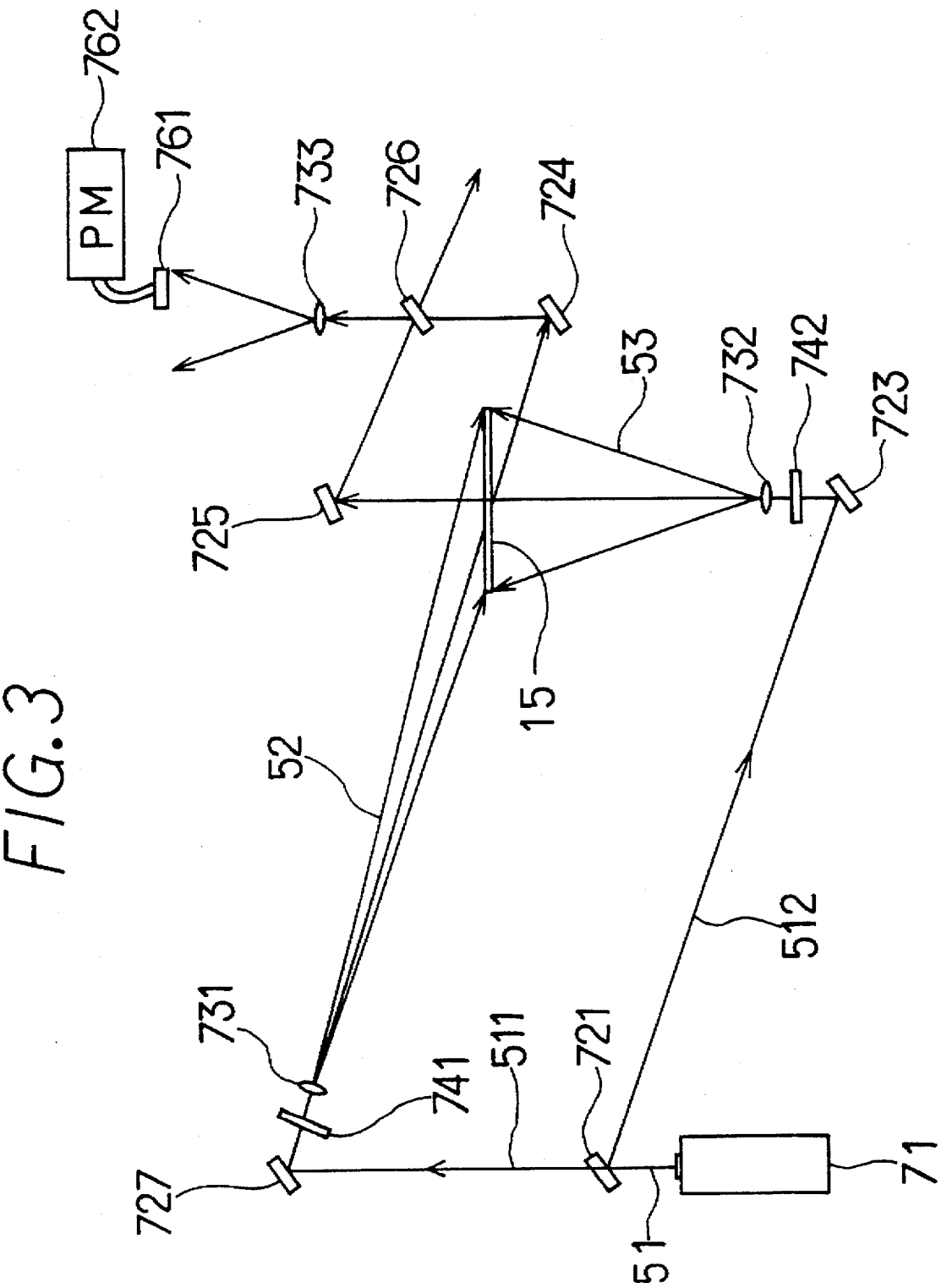
FIG. 3 is a schematic illustration of another manufacturing process of a hologram lens.
Figure 4:
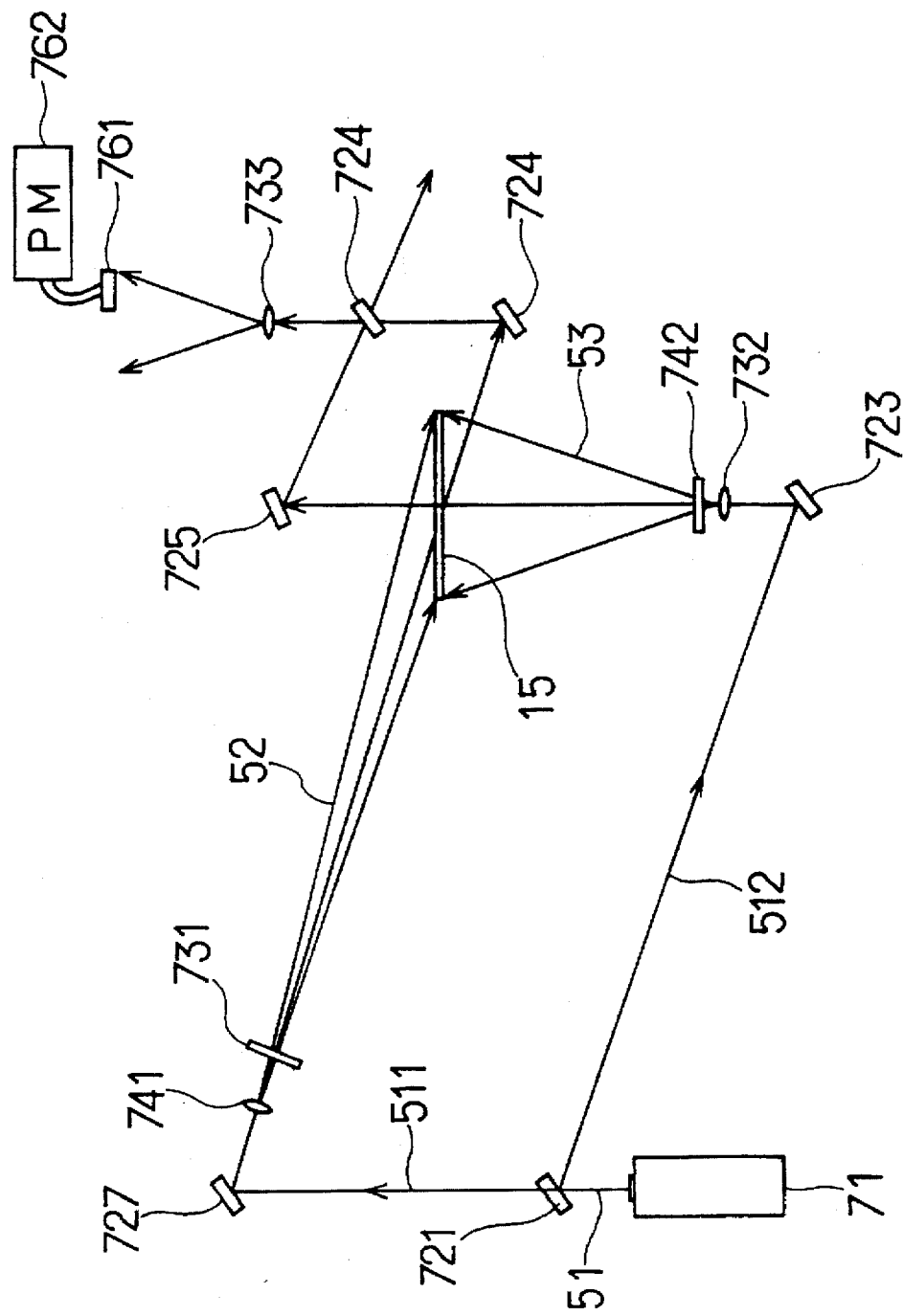
FIG. 4 is a schematic illustration of another manufacturing method of a hologram lens.

FIG. 3 and FIG. 4 illustrate improved arrangement of manufacturing hologram lenses.

Two shutters 741 and 742 are disposed in front of object lenses 731 and 732 respectively close thereto to switch on and off the lights as shown in FIG. 3, or the two shutters 741 and 742 are disposed in front of the dry plate 15 to switch on and off the lights as shown in FIG. 4.

In the above cases, there is little possibility that the related optical parts or components of the shutters will be thermally affected to change the interference condition as stated above, so that the stable time for the exposure maintains for longer than 1 minute.

In the method according to the first embodiment of the present invention, described with reference to FIG. 1, the controllable moving mirror 722 is used and the stable exposure time lasts for more than 5 minutes.

Figure 6:
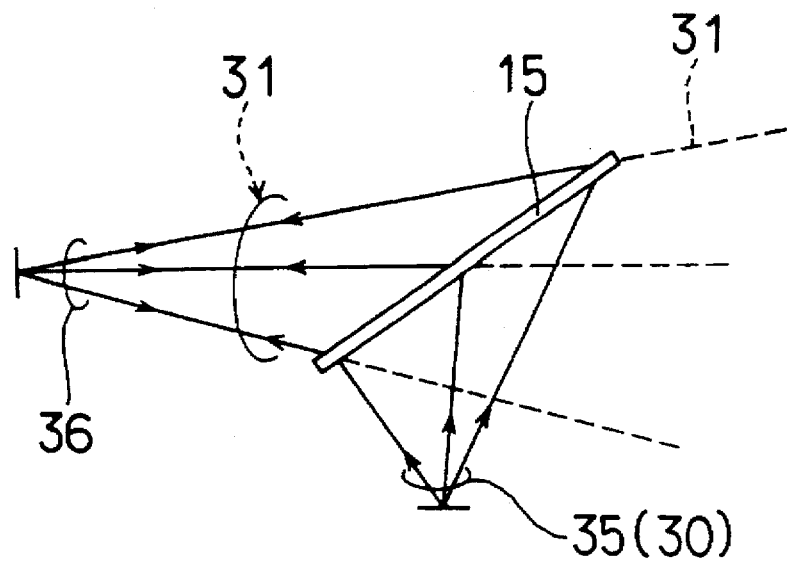
FIG. 6 is a schematic view of a hologram illustrating a process of exposure in a vertical direction.

Next, when a hyperbolic curve is recorded on the hologram 10, a diverging reference light 35 and a diverging object light are irradiated on the opposite sides of the hologram 10 as shown in FIG. 6.

When the hologram lens 10 is used, light paths of the image light 30 and a reproduced light 31 coincide with those of the object light 35 and the reference light 36 respectively. As a result, a virtual image 81 (FIG. 1) is formed at a desirable position.

Figure 5:
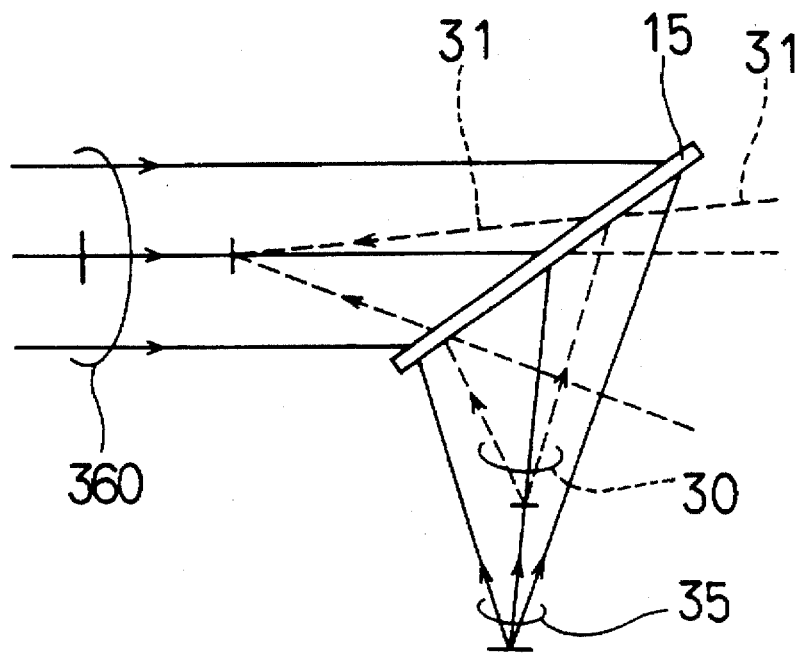
FIG. 5 is a schematic view of a hologram illustrating a process of exposure in a horizontal direction.

On the other hand, when a parabolic curve is recorded on the hologram 10, a parallel reference light 360 is irradiated on a side of the hologram 10 and a diverging object light 35 is irradiated on the other side of the hologram 10 as shown in FIG. 5.

When the hologram lens 10 is used, the light paths of the image light 30 and the reproduced light 31 do not coincide with those of the object light 35 and the reference light 360.

As a result, the virtual image 81 (FIG. 1) changes vertically relative to a set position.

It is noted that when the driver's eyes move horizontally, the virtual image 81 is not significantly distorted or does not become aberrant with the parabolic surface mirror but is distorted or becomes aberrant with the hyperbolic surface mirror.

On the other hand, when the driver's eyes move vertically, the virtual image 81 is distorted or become aberrant with the parabolic mirror, but is not significantly distorted or does not become aberrant with the hyperbolic mirror.

With the head-up display shown in FIG. 1 according to the first embodiment of the present invention in operation, the image light 30 projected from the projector 25 is diffracted and reflected by the hologram 10 disposed on the windshield (not shown), and the reproduced light 31 comes to the driver's eyes. As a result, the driver 85 recognizes the virtual image 81 far ahead of the windshield.

Since the hologram 10 has a hyperbolic mirror characteristic in the vertical direction and a parabolic mirror characteristic in the horizontal direction, the aberration of the image 81 and also its color change is negligibly small even when the driver moves vertically or horizontally.

Figure 7:
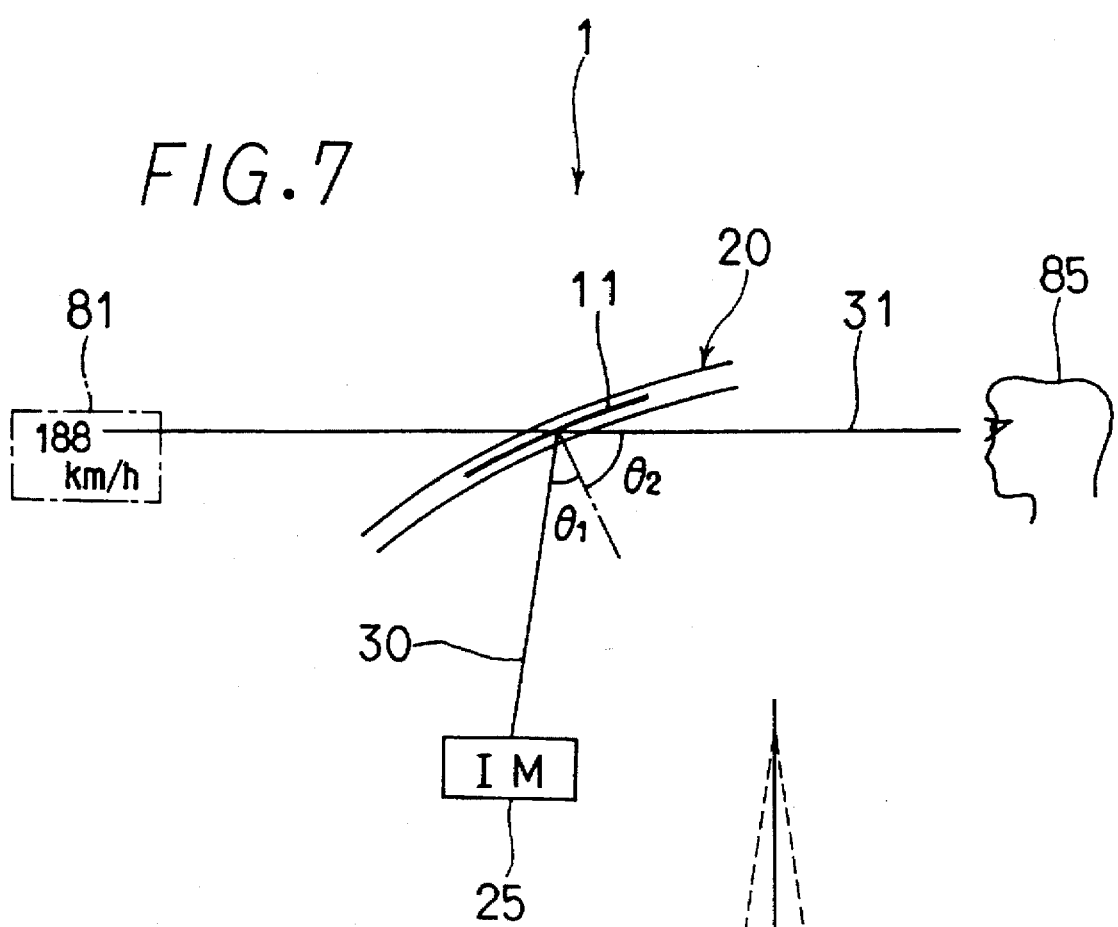
FIG. 7 is a schematic view illustrating a head-up display system according to a second embodiment of the present invention.

A head-up display according to a second embodiment of the present invention is described next with reference to FIG. 7.

A hologram lens 11 is attached on a curved surface of the windshield 20 in this embodiment and other portions are the same as those of the first embodiment.

The hologram lens attached on the windshield has a focal length fo and has the following relationship with the focal lengths fs of a mirror which corresponds to a curved windshield on which the hologram 11 is attached.

$$1/fo = 1/fh + 1/fs,$$

wherein fh is a focal length when the hologram lens is flat.

When a hologram lens 11 having the focal length fh is formed and pasted on a curved windshield 20 having the focal length fh, the desired focal length fo of the hologram lens 11 is obtained with ease.

When the hologram lens 11 is attached directly on the two-dimensional-curved surface of the windshield 20 which corresponds to a mirror having focal lengths fsv in the vertical direction and fsh in the horizontal direction, the focal length fo of the hologram lens 11 has the following relationship with the focal lengths of the above mentioned mirror:

$$1/fo = 1/fhv + 1/fsv = 1/fhh + 1/fsh,$$

wherein fhv and fhh are focal lengths of the hologram lens 11 in the vertical direction and in the horizontal direction respectively when it is formed flat as shown in FIGS. 5 and 6.

The desirable hologram lens 11 is obtained by just attaching and pasting it on the curved windshield 20.

A head-up display according to a third embodiment of the present invention is described next.

The head-up display of the third embodiment includes another improved hologram lens 10 which has diffraction characteristics equal to a parabolic curved mirror.

The mirror characteristic, however, has different parabolic curves having different focal lengths f1 and f2 in order to provide the same focussing position of an virtual image in the vertical and horizontal direction. One parabolic curve is formed along the vertical line formed by intersection of the hologram surface 10 and the vertical plane 41 including the light axis 301 of the image light 30 and the other parabolic curve is formed along a horizontal line formed by intersection of the hologram surface and the horizontal plane 42 including the light axis 301.

Since the parabolic curve mirror characteristic provides decreased inclination of the virtual image when a driver moves horizontally, the hologram lens having the parabolic curves with different focal lengths formed in the both directions provides a more upright virtual image which is useful in case a clear image without inclination is more desirable than the image without vertical shifting.

A fourth embodiment of the present invention is described next with reference to FIG. 1.

The hologram lens 10 has a hyperbolic-curve-diffraction characteristic along a line formed by the intersection of the hologram surface and the vertical plane 41 including the axis 301 of the image light 30, as in the first embodiment, and an elliptic-curve-diffraction characteristic along a line formed by the intersection of the hologram surface and the horizontal plane 42 including the axis 301 of the image light 30 in this embodiment. The focal length of the hyperbolic curve and that of the elliptic curve are arranged so that the focussing position of the virtual images in the vertical direction and in the horizontal direction are the same.

Figure 18:
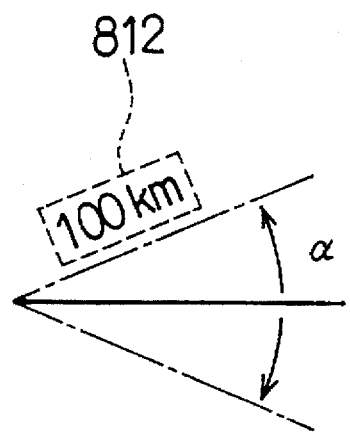
FIG. 18 is a schematic view illustrating an inclination of a virtual image of a conventional head-up display when driver's eyes move horizontally.

The elliptic curve diffraction in the horizontal direction also decreases the image inclination (see FIG. 18) caused by horizontal movement of the driver's eyes.

Figure 8:
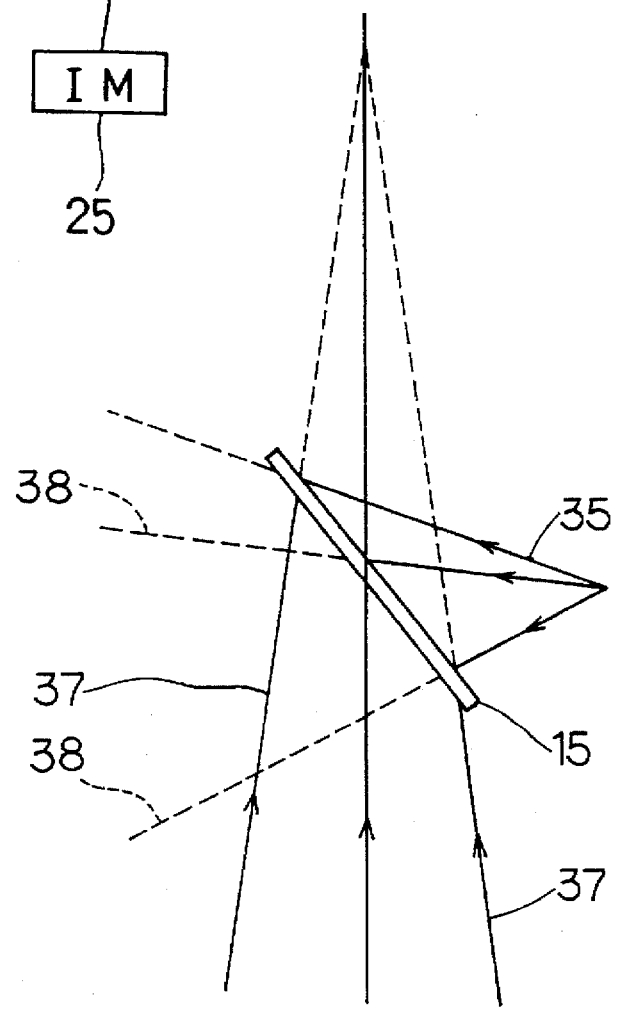
FIG. 8 is a schematic view of a hologram illustrating a process of exposure in a horizontal direction.

When the hologram lens 10 having the elliptic curve mirror characteristic is formed, a converging reference light 37 and a diverging object light 35 are irradiated on the dry plate 15 as shown in FIG. 8.

When an image light 30 (FIG. 1) is projected on the hologram lens 10 in use from the same direction as the reference light 37 (FIG. 8), a diffraction light 38 appears along the extension of the object light 35. The others are the same as the first embodiment.

A head-up display according to a fifth embodiment is described below with reference to FIG. 9.

A flat hologram plate 121 is formed so that the center of the curvature is positioned at a side of the projector 25. In other words, the plate 121 is formed convex to the outside of the windshield. When the driver 85 does not move from the normal driving position, an image light 300 is projected from the projector 25 on a portion around a center 125 of the hologram lens 12 and the reproduced light (diffracted light) comes to the driver's eyes. The virtual image 81 in this condition looks the same to the driver whether the hologram lens is flat as the hologram plate 121 (before bent) or bent as the hologram lens 12 (of the present embodiment).

Figure 9:
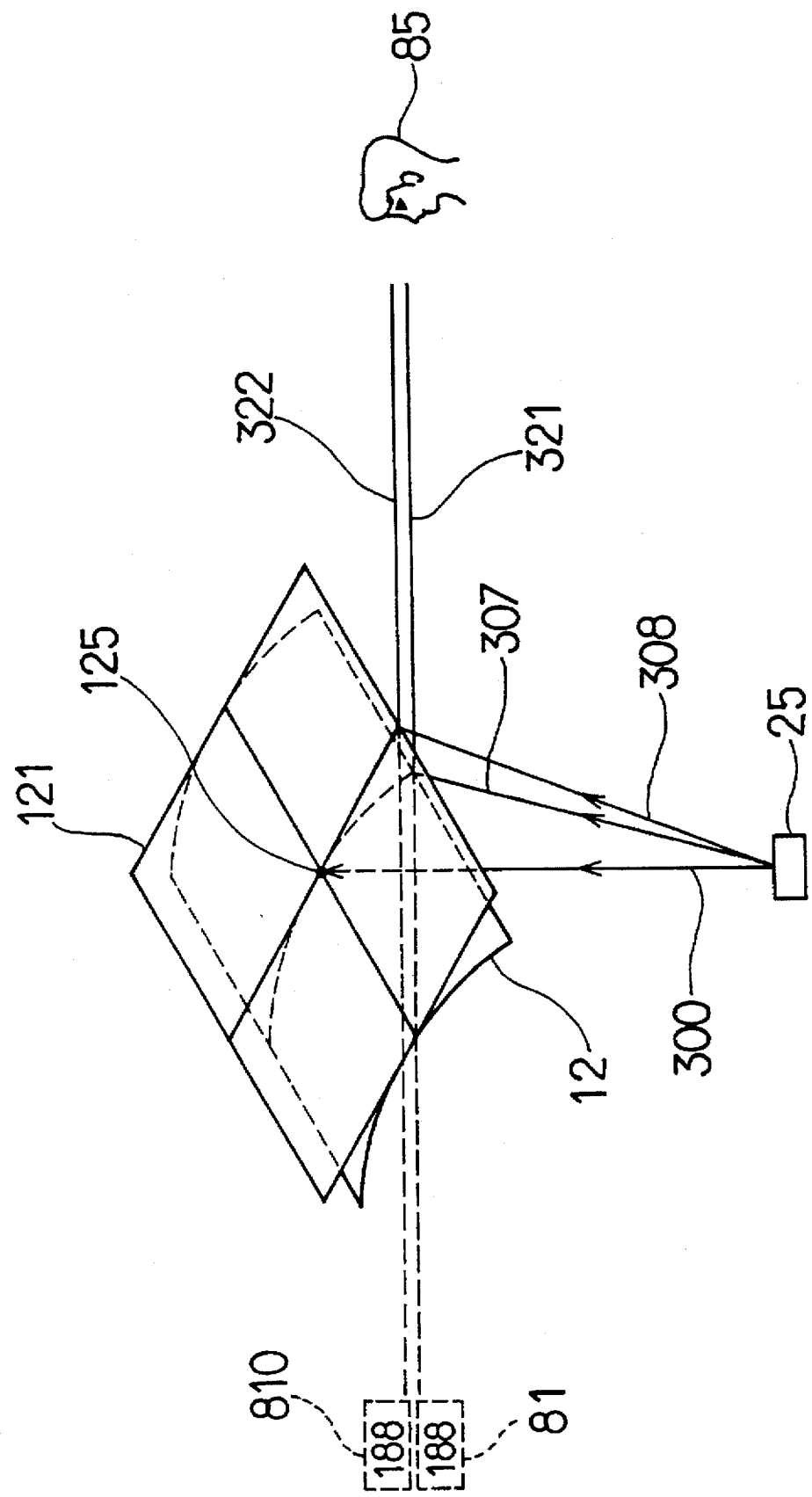
FIG. 9 is a schematic view illustrating a head-up display system according to a fifth embodiment of the present invention.

However, when the driver moves to the right or to the left, while the image lights 308 projected on a fringe portion of the curved hologram lens 12 of the present embodiment forms the virtual image 81 at the normal position, the image light 307 projected on a fringe of the flat plate hologram 121 forms a virtual image 810 above the normal position, as shown in FIG. 9, because of the angle selectivity of the hologram.

Thus, the curved surface hologram lens 12, when appropriate, is effective to cancel aberrations occurring when a driver moves to the right or left and prevents the virtual image 81 from floating upward.

A sixth embodiment is discussed with reference to FIG. 13. The interference pattern of the hologram lens is formed so that the inclined angle to the ground increases as the pattern is located more to the right or left from the center of the hologram lens.

Figure 13:
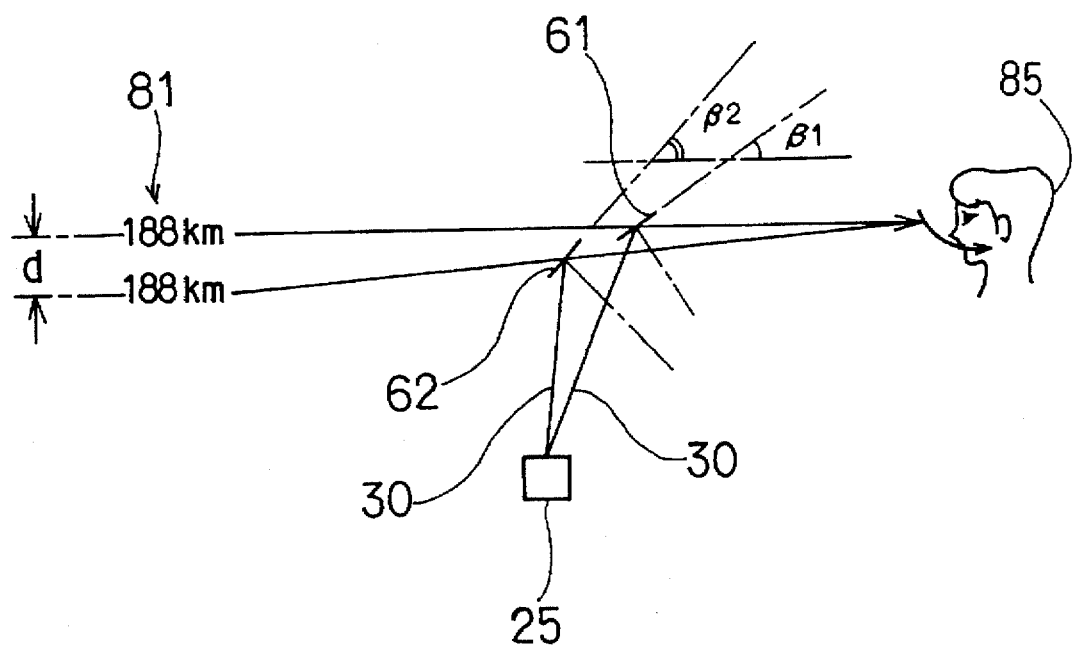
FIG. 13 is a schematic view of an optical system according to the fifth embodiment illustrating an interference pattern.
Figure 19:
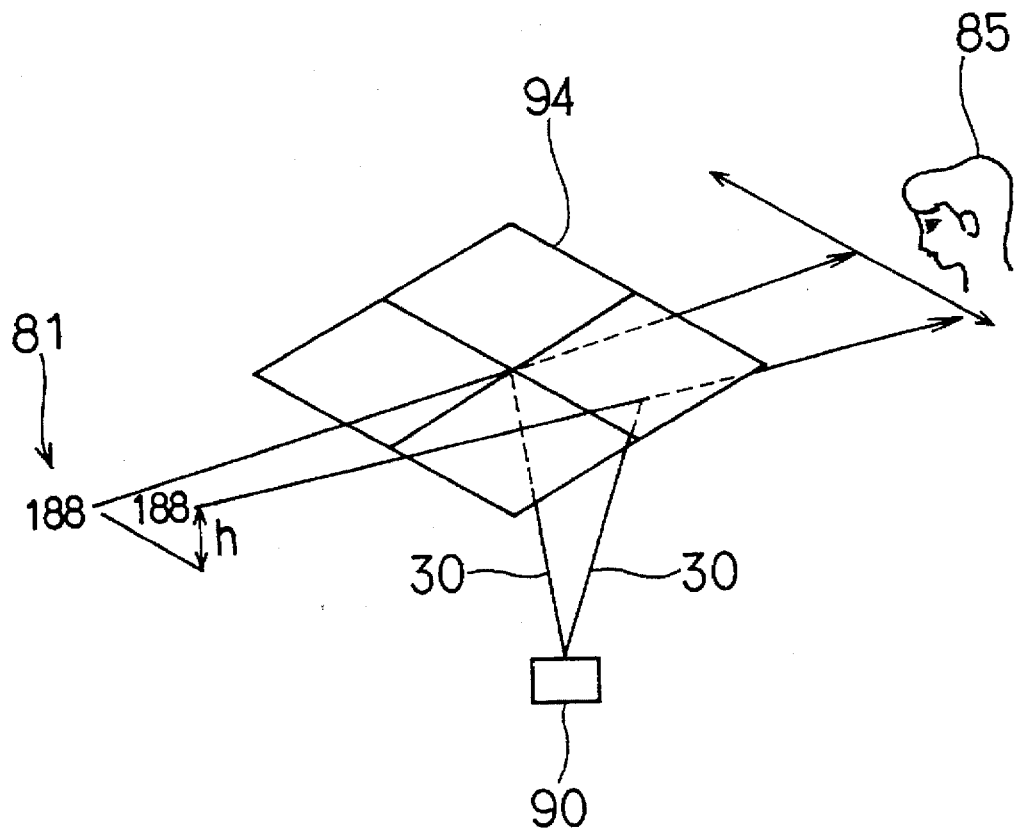
FIG. 19 is a schematic view illustrating a change of an optical path and a position of a virtual image in a conventional head-up display system when driver's eyes move horizontally.

When the inclined angle of the interference pattern increases, the image 81 is shifted down by a descent d as shown in FIG. 13. On the other hand, with the hologram lens having the unchanged inclined angle when the driver moves to the left (or to the right), the image 81 goes up by an ascent h as shown in FIG. 19.

As a result, even if the driver moves to the right or the left, since the descent d and the ascent h cancel each other as described above and the image floating is prevented in this embodiment.

Figure 10:
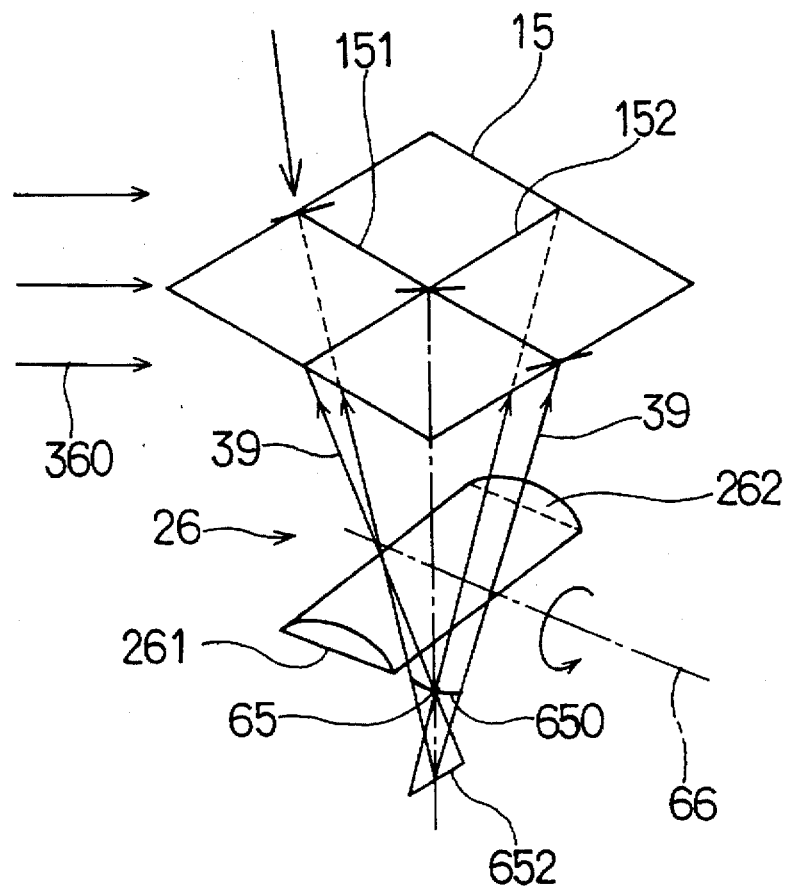
FIG. 10 is a schematic illustration of a manufacturing process of a hologram lens according to a sixth embodiment of the present invention.

FIG. 10 illustrates a method of forming the interference pattern of the above embodiment. In the method, a parallel reference light 360 is irradiated on a side of the dry plate 15 and a divergent object light 39 is irradiated from a spot light source 65 on the other side of the dry plate 15 through a semicylindrical lens 26 disposed between the spot light source 65 and the dry plate 15. The semicylindrical lens 261 has a flat portion 261 and a cylindrical surface 262, and is rotatable around an axis 66 disposed in parallel with a lateral axis 151 of the dry plate 15.

Figure 11:
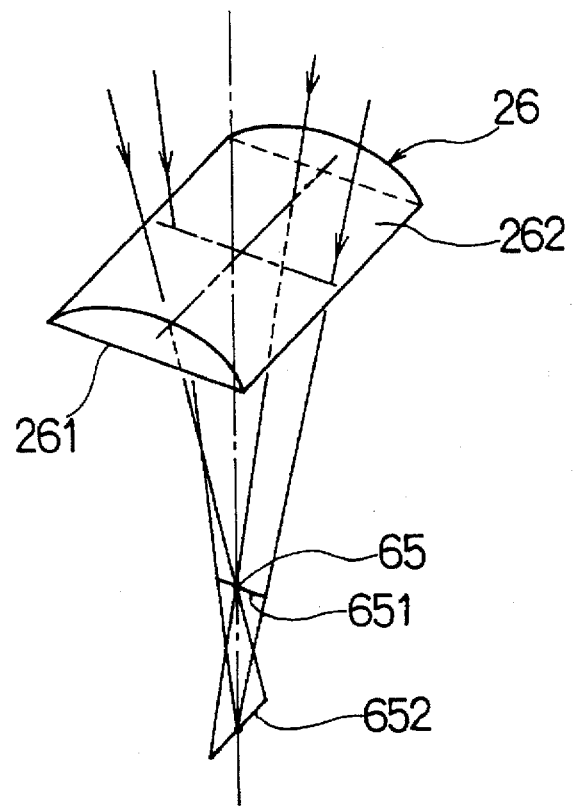
FIG. 11 is a schematic view of an optical system illustrating a function of the hologram lens according to the sixth embodiment.

First, the flat surface 261 of the semicylindrical lens 26 is placed in parallel with the dry plate 15 and the axis (not shown) of the cylindrical surface 262 is placed in parallel with a longitudinal axis 152 of the dry plate 15. As a result, two crossing virtual linear light sources 651 and 652 appear as shown in FIG. 11. In other words, the virtual linear light source 652 appears at the focal point of the semicylindrical lens 26 and the virtual linear light source 651 appears at the spot light source 65.

Second, the semicylindrical lens 26 rotated on the axis 66 so that the upper end thereof comes close to the dry plate 15.

Figure 12:
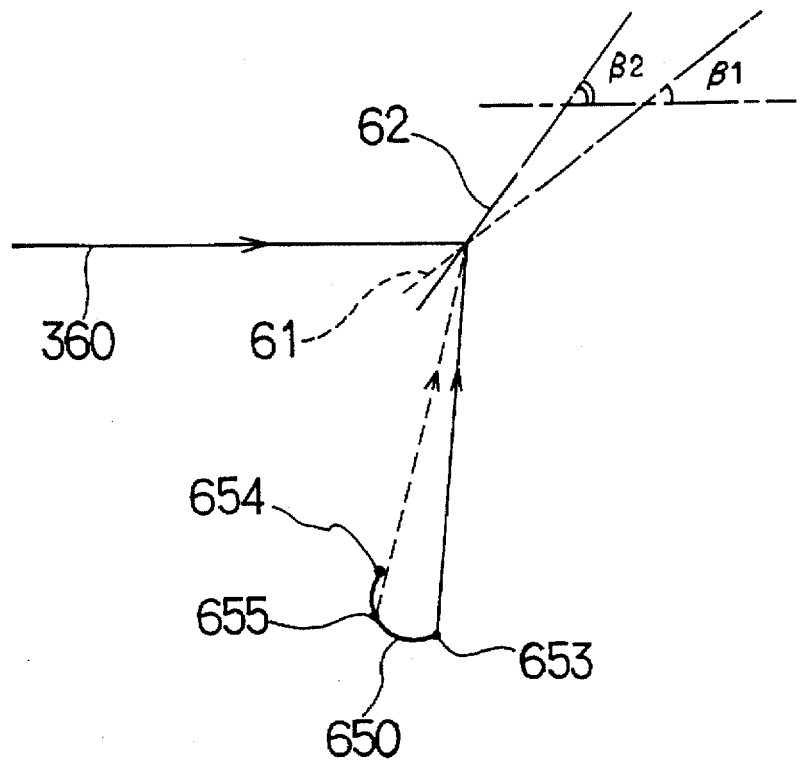
FIG. 12 is a schematic view of an optical system illustrating a function of the hologram lens in rotation according to the sixth embodiment.

The lateral linear light 651 (FIG. 11) forms an arc with a point 655 in the middle thereof in the direction perpendicular to the axis 66, and the ends 653 and 654 of the arc-shaped light source 650 come close to the dry plate 15 as shown in FIG. 12.

As a result, the inclined angle to the ground β2 of the interference pattern 61 recorded on the portion of the dry plate 15 other than the central portion is formed greater than the inclined angle to the ground β1 formed on the central portion.

In the foregoing discussion of the present invention, the invention has been described with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than a restrictive, sense.

What is claimed is:

1. A head-up display for projecting a virtual image ahead of a windshield of a vehicle, comprising:

a projector for projecting an image light; and a hologram lens, disposed on a curved surface of a windshield of said vehicle, having a first diffraction equivalent to a first concave mirror along a line formed by intersection of the hologram lens and a vertical plane, an optical axis of said image light lying on said vertical plane, and a second diffraction equivalent to a second concave mirror along a line formed by intersection of said hologram lens and a horizontal plane, said optical axis of said image light lying on said horizontal plane, said first and second diffractions respectively having a first focal point and a second focal point so that the virtual images formed by said first and second diffractions are focused at the same position.

2. A head-up display for projecting a virtual image ahead of a windshield of a vehicle, comprising:

a projector for projecting an image light; and a hologram lens having a diffraction equivalent to a hyperbolic-curve mirror along a line formed by intersection of the hologram lens and a vertical plane, an optical axis of said image light lying on said vertical plane, and a diffraction equivalent to a parabolic-curve mirror along a line formed by intersection of said hologram lens and a horizontal plane, said optical axis of said image light lying on said horizontal plane.

3. A head-up display for projecting a virtual image ahead of a windshield of a vehicle, comprising:

a projector for projecting an image light; and a hologram lens having a diffraction equivalent to a parabolic-curve mirror which has a focal length f1 along a line formed by intersection of the hologram lens and a vertical plane, an optical axis of said image light lying on said vertical plane, and a diffraction equivalent to another parabolic-curve mirror which has a focal length f2 along a line formed by intersection of said hologram lens and a horizontal plane, said optical axis of said image light lying on said horizontal plane, said focal lengths f1 and f2 being formed so that virtual images focused by said vertical and horizontal parabolic-curve diffractions coincide with each other.

4. A head-up display for projecting a virtual image ahead of a windshield of a vehicle, comprising:

a projector for projecting an image light; and a hologram lens having a diffraction equivalent to a hyperbolic-curve mirror along a line formed by intersection of the hologram lens and a vertical plane, an optical axis of said image light lying on said vertical plane, and a diffraction equivalent to an elliptic-curve mirror along a line formed by intersection of said hologram lens and a horizontal plane, said optical axis of said image light lying on said horizontal plane.

5. A head-up display according to claim 1, wherein said hologram lens is directly attached on said curved surface of said windshield which has a focal length fs, and one of said first and second diffractions has a focal length fo and has the following relationship with said focal length fs of said curved surface of said windshield:

$$1/fo = 1/fh + 1/fs,$$

wherein fh is a focal length of said one diffraction when said hologram lens is flat.

6. A head-up display according to claim 1, wherein said hologram lens is directly attached on said curved surface of said windshield which has focal lengths fsv in the vertical direction and fsh in the horizontal direction, and one of said first and second diffractions has focal lengths fo and has the following relationship with said focal lengths fsv and fsh of said curved surface of said windshield:

$$1/fo = 1/fhv + 1/fsv = 1/fhh + 1/fsh,$$

wherein fhv and fhh are focal lengths of said one diffraction in the vertical and horizontal focal lengths when said hologram lens is flat.

7. A head-up display according to claim 1, wherein said hologram lens has a curved surface convex to the outside of the windshield.

8. A head-up display according to claim 1, wherein said first and second diffractions of said hologram lens have inclined interference patterns and the inclined angle of said pattern to the ground increases as said pattern is located remote from the center of the hologram lens.

* * * * *